F. E. PASCAL.
ARRANGEMENT OF MOTOR ENGINE PARTS FOR BICYCLES.
APPLICATION FILED AUG. 4, 1914.

1,179,138.

Patented Apr. 11, 1916.
2 SHEETS—SHEET 1.

WITNESSES

INVENTOR
FERDINAND ETIENNE PASCAL
BY
his ATTORNEYS

F. E. PASCAL.
ARRANGEMENT OF MOTOR ENGINE PARTS FOR BICYCLES.
APPLICATION FILED AUG. 4, 1914.
1,179,138.
Patented Apr. 11, 1916.
2 SHEETS—SHEET 2.
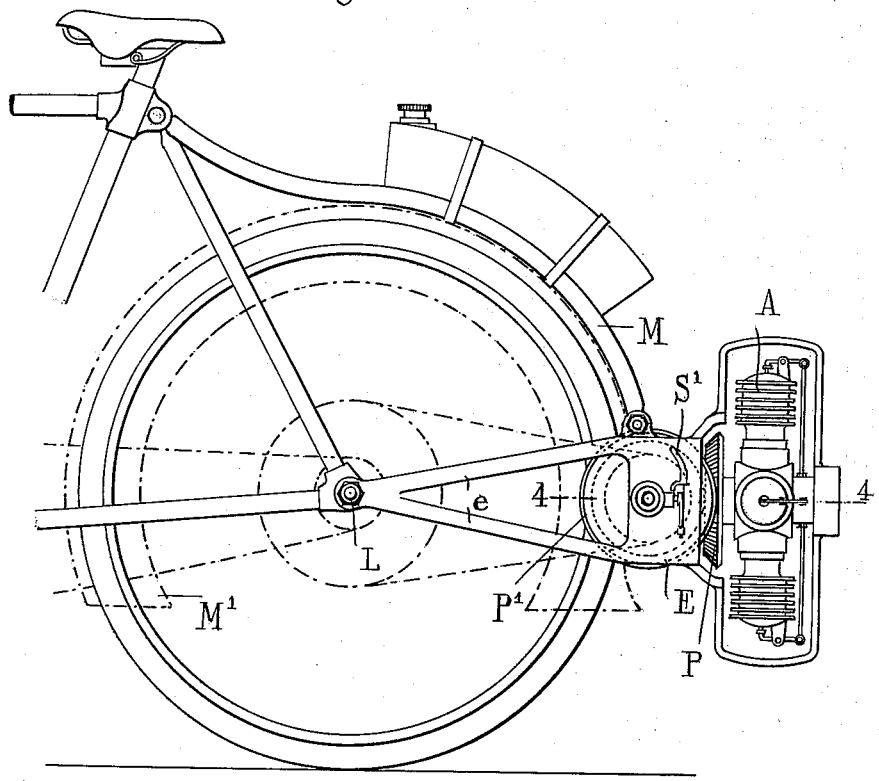
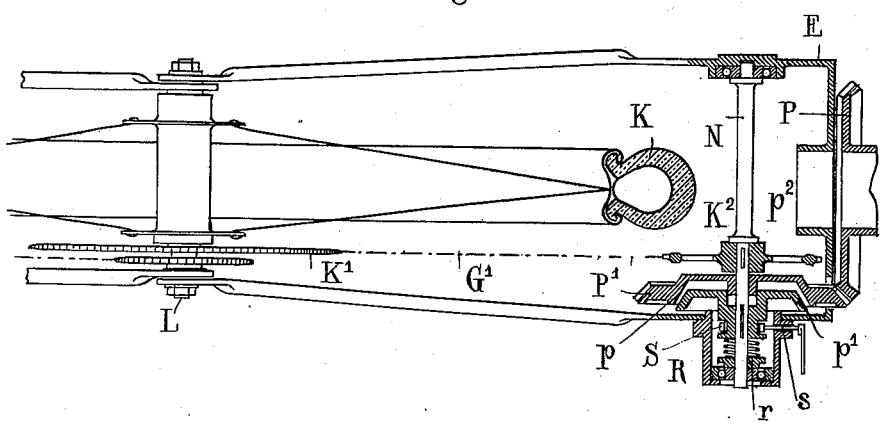
WITNESSES
INVENTOR
FERDINAND ETIENNE PASCAL
BY his ATTORNEYS

UNITED STATES PATENT OFFICE.

FERDINAND ETIENNE PASCAL, OF ST. CLOUD, FRANCE.

ARRANGEMENT OF MOTOR-ENGINE PARTS FOR BICYCLES.

1,179,138. Specification of Letters Patent. Patented Apr. 11, 1916.

Application filed August 4, 1914. Serial No. 854,995.

*To all whom it may concern:*

Be it known that I, FERDINAND ETIENNE PASCAL, a citizen of the Republic of France, and a resident of 48 Quai du Président Carnot, St. Cloud, Seine and Oise, France, have invented a new and useful Arrangement of Motor-Engine Parts for Bicycles, of which the following is a specification.

This invention has for its object an arrangement of motor engine parts adapted to be placed either in the front or at the rear of a bicycle without it being necessary to materially modify the bicycle structure. With this object the motor is carried by one or several horizontal or curved arms secured either to the steering wheel frame or to the main frame at the rear of the machine. These horizontal or curved arms have associated therewith a fork the branches of which may be secured either to the front or the rear axle or to the front or rear forks of the bicycle frame. By means of this arrangement the motor parts are carried either in front of or behind the bicycle and it suffices to tighten a few nuts in order to secure the motor in position.

Three methods of mounting the motor, here shown as of the rotary type, are shown in the annexed drawing in which—

Figure 1:
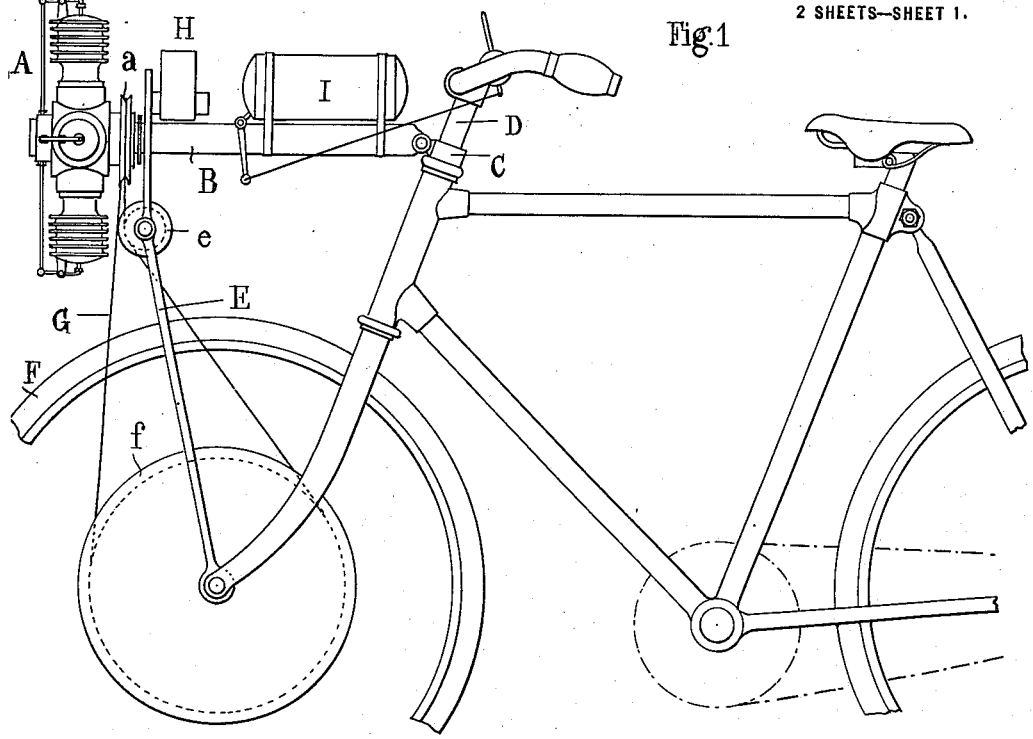
Figure 2:
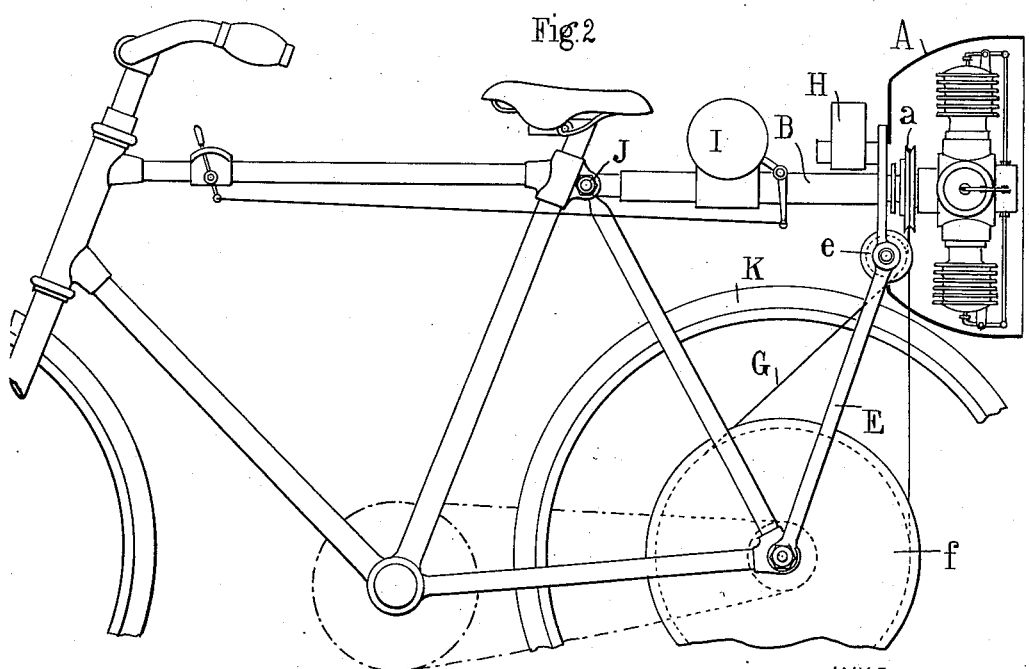

Figure 1 is a broken elevation of a bicycle showing the motor mounted on the steering wheel frame; Fig. 2 is a similar view, showing the motor mounted on the main frame to the rear of the seat; Fig. 3 is a similar view showing the motor carried behind the rear wheel of the machine; and Fig. 4 is a section on line 4—4, Fig. 3, showing on a large scale the transmission of the drive.

Referring to the drawings and particularly to Fig. 1, the rotary motor A is mounted at the end of the horizontal arm B which is fixed at its other extremity to a collar C clamped on the pillar D of the steering handle of the machine. The arm B is also fast with a fork E the legs of which are mounted on the axle of the front wheel F. The motor A is provided with a pulley $a$ over which passes a belt G which runs over the pulley $f$ carried by the wheel F. A guide pulley $e$ mounted on the fork E keeps the belt in contact with a large peripheral extent on the pulley $f$ and incidentally may serve as a tension roller and guide. On the arm B are mounted the ignition magneto H, the spirit tank, I, the carbureter, the throttle, etc.

In Fig. 2. the motor parts are mounted at the rear of the machine. In this case the end of the tube B is fixed to the collar J clamped to the middle pillar or the tube of the frame, and the legs of the fork E engage the axle of the rear wheel K of the machine. A protective casing surrounds the motor.

According to the form shown in Figs. 3 and 4 the rotary motor A is mounted on the head of a fork E the legs $e$ of which engage the rear axle L or some suitable part of the frame. The whole mass is held in this position by means of an arm M which overlies the rear wheel and is fastened to some point at the upper part of the frame. This arm M which carries the tank, the carbureter etc., may be furnished with a mud guard having sides $M^1$ which are shown in dotted lines on the drawing.

The detail of the drive of the back wheel is shown in Fig. 4. This drive consists of a chain $G^1$ passing over a pinion $K^1$ keyed on the hub of the rear wheel K and a second pinion $K^2$ keyed on an intermediate shaft N mounted in ball bearings on the fork E. The drive of the shaft N by the motor A is effected by bevel pinions P and $P^1$. The pinion P is fast to the motor A and the pinion $P^1$ is free on the shaft N. The connection of the pinion $P^1$ and the shaft N is insured by a cone clutch. For this purpose the pinion $P^1$ forms a female cone $p$. The male cone $p^1$ slides on a long key on the shaft N. A compression spring R abutting at one end on the male cone $p^1$ and at the other end on the abutment $r$, fast on the shaft, tends to press the two cones together. A clutch fork S fixed to a shaft $s$, which is rotatably mounted on the fork E, and retained in a circular channel $p^2$ in the male cone $p^1$ provides means for disengaging the two cones. This fork may be controlled in any suitable way from a convenient part of the machine. It is obvious that these arrangements of the motor parts have only been given by way of example. The motor instead of being rotary could be fixed. The drive instead of being effected by belt as shown in Figs. 1 and 2, could be accomplished by chain, friction, etc. In the same way in the form shown in Fig. 3 the drive by chain could be replaced by a belt drive.

Having now particularly described and ascertained the nature of the said invention and in what manner the same is to be performed I declare that what I claim is:—

1. In a motor cycle, a rotary motor, a frame therefor and means for readily mounting the same on the frame of an ordinary bicycle with the axis of the motor in the plane of the bicycle wheels, in combination with a driving connection between the motor and one of said wheels, said connection comprising a countershaft geared to the motor and a clutch interposed between said shaft and the driven wheel.

2. In a motor cycle, a rotary motor, a frame therefor and means for readily mounting the same on the frame of an ordinary bicycle with the axis of the motor in the plane of the bicycle wheels, in combination with a driving connection between the motor and one of said wheels, said connection comprising a countershaft geared to the motor and parallel to the axle of the driven wheel and a clutch interposed between said shaft and the wheel.

3. In a motor cycle, a rotary motor, a frame therefor and means for readily mounting the same at the rear of the frame of an ordinary bicycle with the axis of the motor in the plane of the bicycle wheels, together with a rear wheel mud guard carried by said frame.

4. In a motor cycle, a rotary motor, a frame therefor and means for readily mounting the same on the frame of an ordinary bicycle, a bevel wheel fast with the motor, a countershaft and driving connections thereon to one of the bicycle wheels, a bevel wheel on said countershaft gearing with said first mentioned bevel wheel, and a clutch for establishing operative engagement between said driving connection and the driven bevel wheel.

5. In a motor cycle, a rotary motor, a frame therefor comprising a fork straddling the rear wheel and a suspension member extending from the head of the fork to the upper part of the bicycle frame and serving to hold the motor behind the rear wheel and substantially at the level of its axis, as described.

6. In a motor cycle, a rotary motor, a frame therefor comprising a fork straddling the rear wheel and a suspension member extending from the head of the fork to the upper part of the bicycle frame and serving to hold the motor behind the rear wheel and substantially at the level of its axis, together with a mud guard carried by said suspension member and overlying the rear wheel.

7. In a motor cycle, a rotary motor, a frame therefor comprising a fork straddling the rear wheel and a suspension member extending from the head of the fork to the upper part of the bicycle frame and serving to hold the motor behind the rear wheel and substantially at the level of its axis, together with a mud guard and fuel tank carried by said suspension member and overlying the rear wheel.

In testimony whereof, I have signed my name to this specification, in the presence of two subscribing witnesses.

FERDINAND ETIENNE PASCAL.

Witnesses:
   EUGÉNE LÉORIS,
   PIERRE LEJEUNE.